(12) United States Patent
Sun

(10) Patent No.: US 8,274,795 B2
(45) Date of Patent: Sep. 25, 2012

(54) PORTABLE ELECTRONIC DEVICE WITH HOLLOW SUPPORT

(75) Inventor: Hou-Xin Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 209 days.

(21) Appl. No.: 12/859,279

(22) Filed: Aug. 19, 2010

(65) Prior Publication Data

US 2011/0157841 A1   Jun. 30, 2011

(30) Foreign Application Priority Data

Dec. 29, 2009   (CN) .......................... 2009 1 0312530

(51) Int. Cl.
*H05K 1/00* (2006.01)
(52) U.S. Cl. .................. 361/748; 361/679.57; 174/483; 174/665; 439/42; 439/263; 439/350; 439/462; 439/882; 379/433.01; 379/433.02; 433/126
(58) Field of Classification Search .................. 361/748, 361/679.57; 174/483, 665; 439/42, 263, 439/350, 462, 882; 379/433.01, 433.02; 433/126
See application file for complete search history.

(56) References Cited

U.S. PATENT DOCUMENTS

| | | | | |
|---|---|---|---|---|
| 4,178,490 A | * | 12/1979 | Boenecke | 379/433.01 |
| 4,572,923 A | * | 2/1986 | Castellani et al. | 174/483 |
| 5,139,431 A | * | 8/1992 | Saitoh et al. | 439/364 |
| 5,567,174 A | * | 10/1996 | Ericson et al. | 439/462 |
| 5,890,925 A | * | 4/1999 | Bernardini | 439/433 |
| 6,428,336 B1 | * | 8/2002 | Akerfeldt | 439/263 |
| 6,526,210 B1 | * | 2/2003 | Harrison et al. | 385/134 |
| 2002/0021551 A1 | * | 2/2002 | Kashiwagi | 361/683 |
| 2002/0086560 A1 | * | 7/2002 | Kendall | 439/42 |
| 2003/0073055 A1 | * | 4/2003 | Pollock et al. | 433/126 |
| 2004/0067675 A1 | * | 4/2004 | Heebe et al. | 439/348 |
| 2005/0095557 A1 | * | 5/2005 | Pollock et al. | 433/126 |
| 2006/0172578 A1 | * | 8/2006 | Parsons | 439/291 |
| 2006/0271016 A1 | * | 11/2006 | Fangrow | 604/539 |
| 2007/0112313 A1 | * | 5/2007 | Fangrow | 604/246 |
| 2007/0190487 A1 | * | 8/2007 | Pollock et al. | 433/126 |
| 2008/0012788 A1 | * | 1/2008 | Brocheton et al. | 343/906 |
| 2008/0026647 A1 | * | 1/2008 | Boehnlein et al. | 439/882 |
| 2009/0047625 A1 | * | 2/2009 | Pollock et al. | 433/126 |
| 2009/0215302 A1 | * | 8/2009 | Roberts | 439/350 |
| 2010/0229414 A1 | * | 9/2010 | Nonni et al. | 33/558 |
| 2010/0255704 A1 | * | 10/2010 | Gardner et al. | 439/301 |
| 2011/0196399 A1 | * | 8/2011 | Robertson et al. | 606/169 |

FOREIGN PATENT DOCUMENTS

TW   M338018   8/2008

* cited by examiner

*Primary Examiner* — Xiaoliang Chen
(74) *Attorney, Agent, or Firm* — Altis Law Group, Inc.

(57) ABSTRACT

A portable electronic device includes a main body, a circuit board in the main body, a rear cover, at least one first conductive member exposed through the rear cover and electrically connected to the circuit board, and a support assembly. The support assembly includes a hollow support detachably connected to the rear cover, at least one second conductive member connected to the hollow support and staying in contact with the at least one second conductive member, and at least one cable extending through the hollow support and comprising a first end electrically connected to the at least one second conductive member, and a second end extending out of the hollow support for connecting with a peripheral.

6 Claims, 3 Drawing Sheets

PORTABLE ELECTRONIC DEVICE WITH HOLLOW SUPPORT

BACKGROUND

1. Technical Field

The present disclosure relates to support assemblies and, particularly, to a support assembly for a portable electronic device.

2. Description of Related Art

Digital photo frames are devices for displaying electronic image files and usually include a support stand. The digital photo frames typically have peripherals, such as a power adapter, headphones, a remote controller, etc., which needs corresponding ports or slots arranged in the housing of the digital photo frames. The ports or slots may adversely affect the appearance of the digital photo frames.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
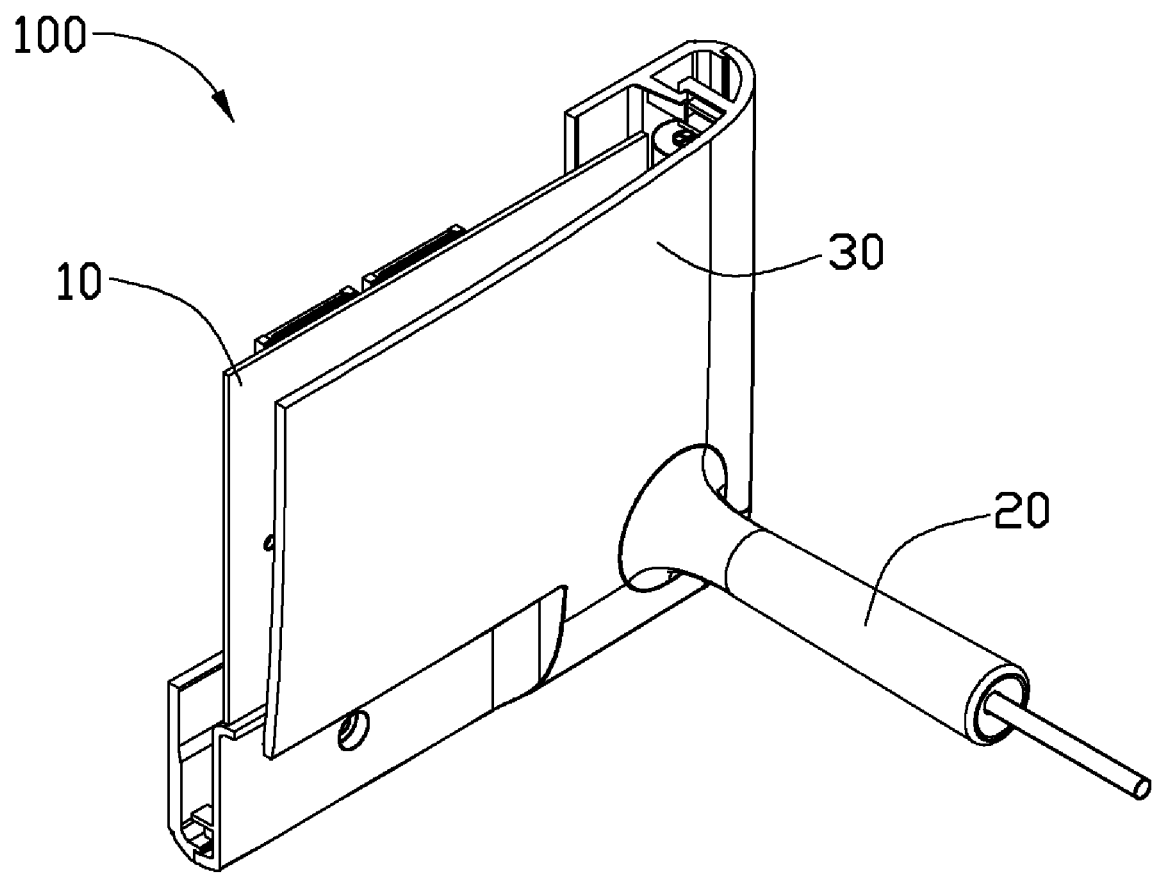
FIG. 1 is a partial, isometric, assembled view of a portable electronic device in accordance with an exemplary embodiment of the present disclosure.

FIG. 1 shows a portable electronic device 100 in accordance with an exemplary embodiment of the present disclosure. In this instance, the portable electronic device 100 is a digital photo frame. The portable electronic device 100 includes a front cover (not labeled), a display device (not labeled), a circuit board 10, a support assembly 20, and a rear cover 30. The support 20 is mounted on the rear cover 30.

Figure 2:
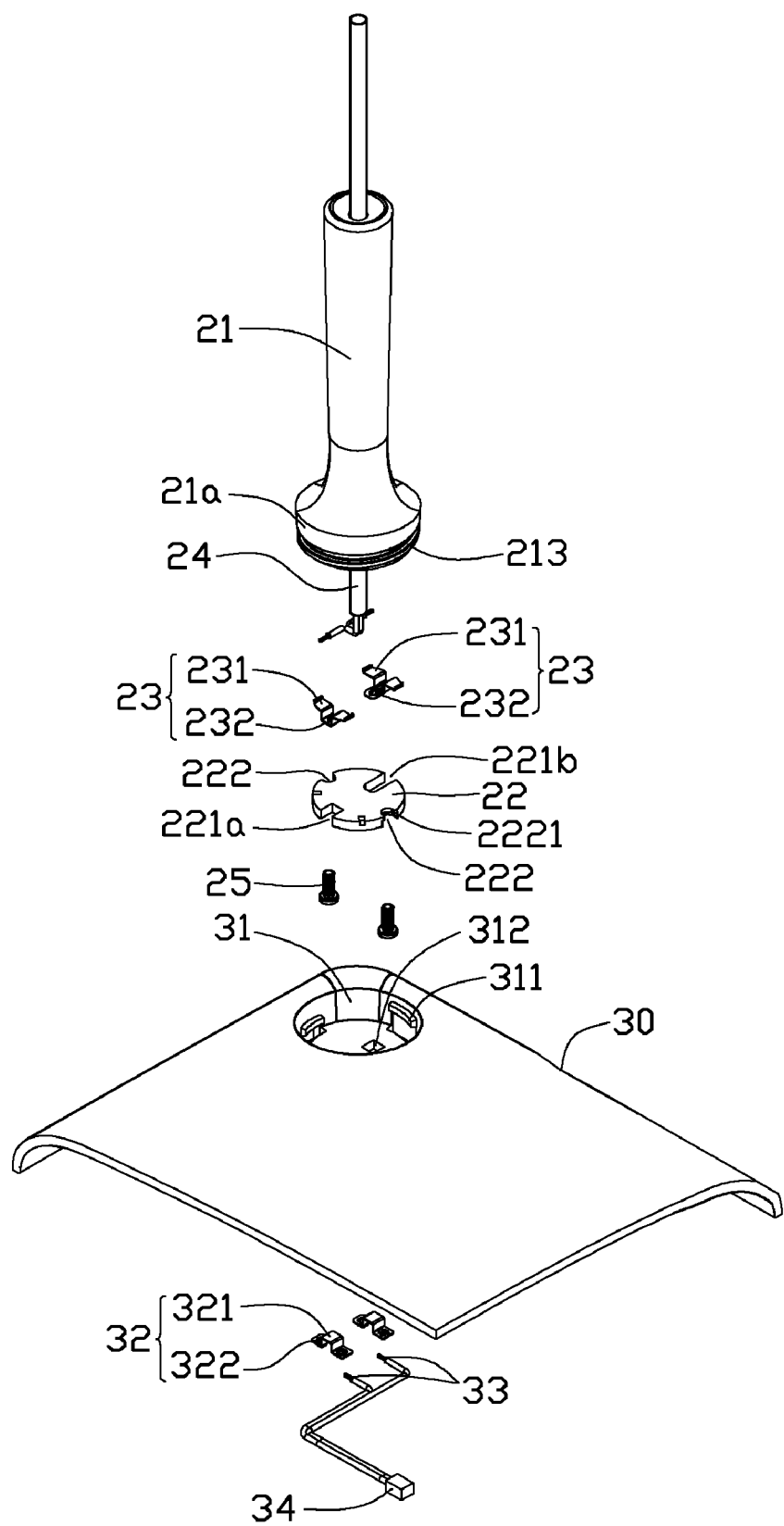
FIG. 2 is an isometric, exploded view of the portable electronic device of FIG. 1.
Figure 3:
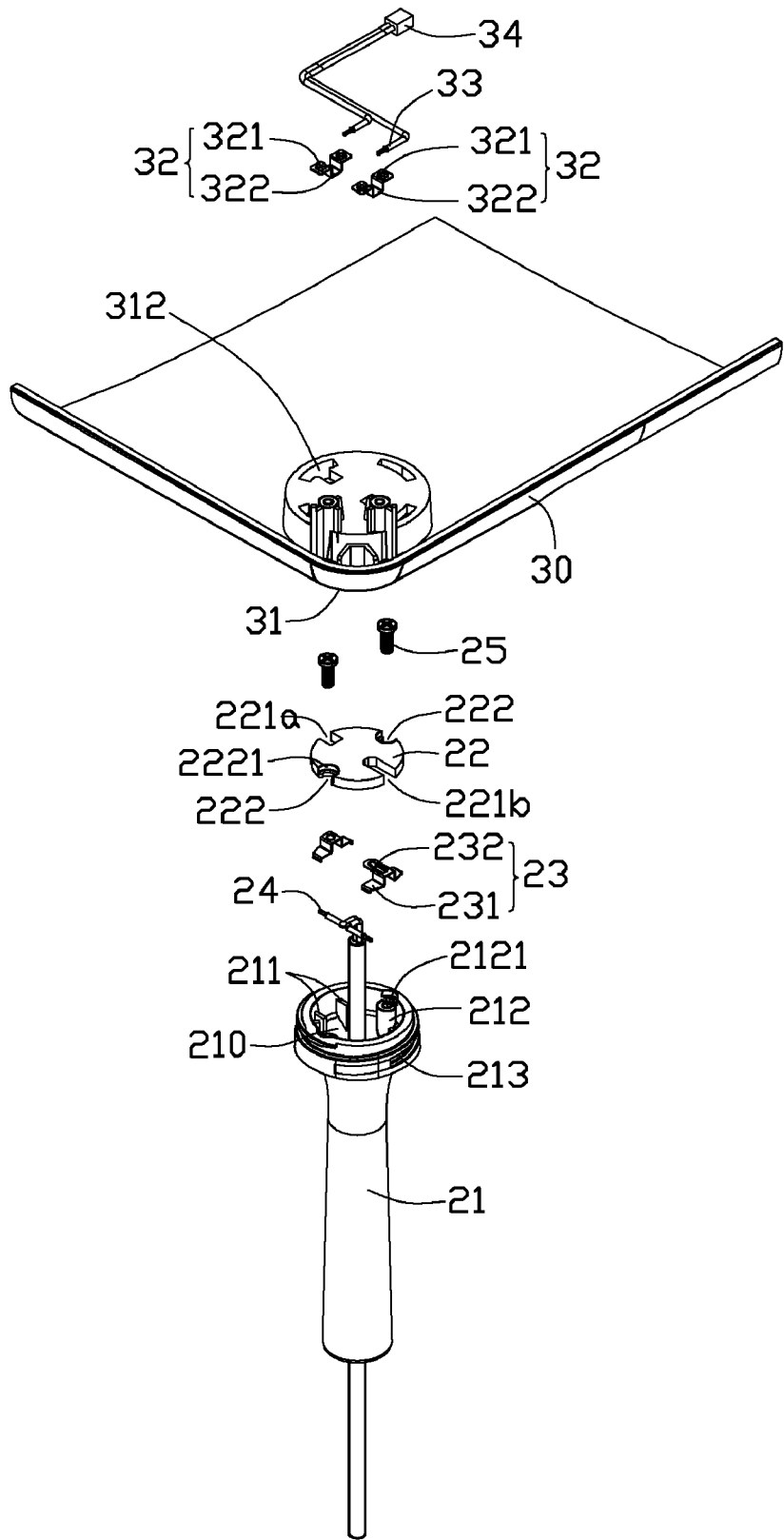
FIG. 3 is an inverted, exploded view of the portable electronic device of FIG. 2.

Referring to FIGS. 2-3, in this embodiment, a blind hole 31 is formed in the rear cover 30 to accommodate one end of the support assembly 20. Two protruding tabs 311 protrude from a lateral surface of the blind hole 31. Two openings 312 (one not shown) are formed in a bottom surface bounding the blind hole 31.

The portable electronic device 100 also includes two first conductive members 32 that are electrically connected, via two cables 33, to an electronic component 34, such as a processor of the portable electronic device 100. Each of the first conductive members 32 comprises two free ends 321 and a raised portion 322 connecting the two free ends 321. The two free ends 321 can be fixed to the circuit board 10. A top end of the raised portion 322 protrudes out of the blind hole 31 via the opening 312.

The support assembly 20 includes a hollow support 21, a lid 22, two second conductive members 23, and a cable 24.

The hollow support 21 defines a receiving space 210 along its longitudinal direction. Two pairs of supporting tabs 211 (one pair not shown) protrude from a lateral surface of the receiving space 210. Two connecting posts 212 (one not shown) are formed on the lateral surface of the receiving space 210 and extend along the longitudinal direction of the support 21. Each of the connecting post 212 defines a threaded hole 2121 along its longitudinal direction. The support 21 also includes a connecting end 21a that defines a spiral groove 213 in its outer lateral surface. The spiral groove 213 includes an open end to allow the protruding tabs 311 to be received in the groove 213 as the end 21a rotates into the blind hole 31, such that the support 21 can be detachably connected to the rear cover 30. In an alternative embodiment, the connected end 21 is externally threaded and the blind hole 31 is correspondingly internally threaded, thereby connecting the support 21 can be engaged with the rear cover 30.

The lid 22 defines a first notch 221a and a second notch 221b. The first notch 21a and the second notch 221b are constructed to respectively match the two second conductive members 23. The lid 22 also defines two opposite stepped openings 222 at its edge. Each of the stepped openings 222 includes a semi-annular surface 2221. In the embodiment, the lid 22 rests on the connecting post 212 and two screws 25 respectively pass through the two openings 222 and are screwed into the threaded holes 2121. The heads of the screws 25 abut tightly against the semi-annular surface 2221, thereby fixing the lid 22 to the connecting post 212.

Each second conductive member 23 comprises two free ends 231 and a raised portion 232 connecting the two free ends 231. The two free ends 231 are placed under the lid 22 and rest on one pair of the supporting tabs 211. The raised portions 232 of the two second conductive members 23 protrude out from the first notch 221a and the second notch 221b respectively.

The cable 24 extends through the hollow support 21 along its longitudinal direction. The cable 24 includes two wires, each of which is electrically connected with one of the second conductive members 23.

After the support 21 is connected to the rear cover, each of the raised portions 232 of the second conductive member 23 stays in contact with one of the second raised portions 322 of the first conductive member 32, thus electrically connecting one end of the cable 24 to the circuit board 10. The other end of the cable 24 extends out of the support body 21 and includes an interface for connecting with external devices such as headphones, a remote controller etc.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device comprising:
   a main body comprising a circuit board, a rear cover, and at least one first conductive member exposed through the rear cover and electrically connected to the circuit board, wherein the each of the at least one first conductive member comprises two free ends and a raised portion connecting the two free ends, the two free ends are fixed to the circuit board, and a top end of the raised portion protrudes out of the rear cover;
   a support assembly comprising:
      a hollow support detachably connected to the rear cover;
      at least one second conductive member connected to the hollow support and staying in contact with the at least one second conductive member; and
      at least one cable extending through the hollow support and comprising a first end electrically connected to the at least one second conductive member, and a second end extending out of the hollow support for connecting with a peripheral.

2. The portable electronic device as claimed in claim 1, wherein a blind hole is formed in the rear cover, at least one protruding tab protrudes from a lateral surface of the blind hole, the support assembly further comprises a connecting end that defines a spiral groove in its outer lateral surface, the spiral groove comprises an open end to allow the at least one protruding tab to be received in the groove as the connecting end rotates into the blind hole, such that the support is detachably connected to the rear cover.

3. The portable electronic device as claimed in claim 1, wherein the support assembly comprises a connecting end defining external threads, and a blind hole is formed in the rear cover, the blind hoe define internal threads to engage the external threads, thereby connecting the support to the rear cover.

4. The portable electronic device as claimed in claim 1, wherein the hollow support defines a receiving space along its longitudinal direction, and at least one pair of supporting tabs protrudes from the lateral surface of the receiving space, and each of the at least one second conductive member comprises two free ends and a raised portion connecting the two free ends, the two free ends rest on one pair of the at least one pair of supporting tabs.

5. The portable electronic device as claimed in claim 1, wherein the support assembly also comprises a lid defining at least two stepped openings at its edge, at least two connecting posts are formed on a lateral surface of the receiving space and extend along the longitudinal direction of the support, each connecting post defines a threaded hole along its longitudinal direction, the lid rests on the connecting post, and screws respectively pass through the openings and into the threaded holes to fix the lid to the at least two connecting post.

6. The portable electronic device as claimed in claim 4, wherein the lid defines at least one notch constructed to match the at least second conductive member, and the raised portion of each of the at least one second conductive member protrudes out from the corresponding one of the at least one notch.

* * * * *